United States Patent [19]
Feder et al.

[11] 3,755,084
[45] Aug. 28, 1973

[54] PROCESS FOR THE PREPARATION OF APOENZYME

[76] Inventors: Joseph Feder, 935 Mulberry Ln., St. Louis, Mo. 63130; Linda R. Garrett, 110 E. Clinton, St. Louis, Mo. 63122

[22] Filed: June 23, 1971

[21] Appl. No.: 156,129

[52] U.S. Cl. .............................................. 195/66 R
[51] Int. Cl. ............................................ C07g 7/02
[58] Field of Search .............. 195/66 R, 66 B, 66 A, 195/62

[56] References Cited
OTHER PUBLICATIONS

Coleman et al., Journal of Biological Chemistry Vol. 237, No. 11, pages 3430–3436, 1962.
Coleman et al., Journal of Biological Chemistry Vol. 236, No. 8, 1961, page 2244.

*Primary Examiner*—Lionel M. Shapiro
*Attorney*—Lynden N. Goodwin et al.

[57] ABSTRACT

Metal is removed from metal containing (metallo) enzyme by providing a solution of the metallo enzyme and a chelating agent for the metal of the metallo enzyme, passing the solution through a column of a hydrophilic, water insoluble, cross-linked dextran polymer gel, which gel retards the passage of metal-chelating agent complex but does not retard the passage of enzyme and recovering enzyme substantially free from metal. Metallo enzymes which can be employed are protease enzyme such as neutral protease obtained from bacillus organisms. Suitable chelating agents include 1,10-phenanthroline.

8 Claims, No Drawings

3,755,084

PROCESS FOR THE PREPARATION OF APOENZYME

BACKGROUND OF THE INVENTION

1. Field of the Invention

This invention relates to a process for preparing apoenzyme. In a particular aspect, this invention relates to a process for removing metal from metallo enzyme. In a further aspect, this invention relates to a process for removing metal from metal containing (metallo) enzyme by first forming a solution of metal containing enzyme and chelation agent which forms a complex with the metal contained in the enzyme and then contacting the solution with a hydrophilic, water insoluble cross-linked dextran polymer gel which does not retard passage of the enzyme substantially free of metal but does retard passage of the complex to separate the metal complex from the enzyme and thereby to obtain enzyme substantially free of metal.

2. Prior Art:

Numerous enzymatic materials require for activity the presence of a metal or metals, such as zinc, calcium and copper, in the enzyme. The preparation of metallo enzymes containing a metal atom not originally present in the enzyme requires, in many cases, first preparation of an apoenzyme. The preparation of apoenzyme (enzyme substantially free of metal) by removing the naturally occurring metal from association with the enzyme has been carried out using dialysis procedures. In a typical procedure, the metallo enzyme is first mixed with a chelating agent for the metal of the enzyme to form a complex of the metal with the chelating agent and the metal complex is then separated from the enzyme by dialysis. This general procedure, even though typically requiring extended time periods, has proven satisfactory when the enzyme protein is stable to long-term exposure to buffers employed and to the dialysis procedure itself. However, numerous metallo enzymes, and particularly proteolytic enzymes, such as the metallo neutral proteases, are quite susceptible to denaturation and autolysis under such conditions for extended periods of time with resulting loss of considerable enzymatic activity.

SUMMARY OF THE INVENTION

It is an object of the present invention to provide a process for preparing apoenzymes.

It is a further object of the present invention to provide a process for removing metal from metallo enzymes without concurrent loss of enzymatic activity.

It is a still further object of the present invention to provide a process for removing metal from metallo enzymes which does not require extended time periods of previously employed dialysis procedure.

Other objects and advantages of the present invention will be apparent in the specification and appended claims.

The present invention resides in the discovery that metal is removed from metallo enzymes by contacting a solution of metallo enzyme and chelating agent for the metal with a hydrophilic, water insoluble, cross-linked dextran polymer gel, which gel retards the passage of the metal complex of solution but does not retard the passage of the enzyme of the solution, and recovering a solution containing enzyme substantially free of said metal.

DETAILED DESCRIPTION

In accordance with the present invention, a solution of metallo enzymes and chelating agent for the metal or metals of the enzyme is formed. It is preferred to form the solution in a buffer solution in which the enzyme is readily soluble and which maintains the pH of the solution at or close to the pH of maximum stability of the enzyme. Of course, buffer solutions in which the enzyme is not stable should be avoided. Suitable buffer solutions, such as aqueous solutions of N-2-hydroxyethylpiperazine-N-2-ethane sulfonic acid (Hepes buffer) are well known to the art. The solution is typically prepared by adding metallo enzyme to a buffer solution containing the chelating agent.

Any suitable chelating agent may be employed in the process of the present invention and such suitable chelating agents are known and available to the art. The chelating agent employed will, of course, depend principally upon the metal of the metallo enzyme. A particularly suitable chelating agent for zinc which is the metal most commonly found in metallo enzymes is 1,10-phenanthroline. Other suitable chelating agents include ethylene diamine tetracetic acid 8-hydroxyquinoline, sodium diethyl dithiocarbomate, diphenyl-thiocarbazone, etc. and the like. In cases where zinc and calcium are both present as metals in the enzyme and it is preferred to remove both the zinc and calcium, ethylene diamine tetracetic acid is preferably used as chelating agent whereas when it is desired to remove the zinc and not calcium 1,10-phenanthroline is employed.

After forming the solution containing enzyme and chelating agent the solution is contacted with a hydrophilic, water-insoluble, dextran polymer gel to separate the complex of metal and chelating agent from the enzyme. The polymer gel employed comprises a three dimensional microscopic network of cross-linked dextran substances which retards the passage of the metal complex of solution but does not retard the passage of the enzyme solution. Gel materials of this type and methods of making the same are well known and are described in British Pat. No. 854,715. These gel materials are commercially available in a variety of grades based on pore size under the name "Sephadex." The "Sephadex" materials which are preferred for use in the process of the present invention are those which are capable of passing without retardation solution material having a molecular weight greater than 5,000 but which pass solution material having a molecular weight smaller than 5,000 with retardation.

Separation of enzyme and solution from the complex of metal and chelator of solution by contacting the solution with the dextran polymer gel may be accomplished using any suitable procedure. The separation is conveniently accomplished by placing the dextran gel in a column such as a chromatographic type column and filling the column with buffer solution. A buffer solution containing metallo enzyme and chelation agent for the metal is then introduced into the column and permitted to percolate therethrough. Thereafter the column is eluted with a suitable eluent such as the buffer-chelator solution free of enzyme. The first product obtained is apo-enzyme.

The filtration can be carried out at temperatures conducive to enzyme stability. Filtration is preferably carried out at the pH of maximum stability of the enzyme.

The solids concentration or viscosity of the enzyme containing solution is not of particular importance provided, of course, that it is capable of being handled in the equipment utilized. With high solids content filtration times are typically longer. Preferably the enzyme preparation is introduced into the column in amounts corresponding to about 5 to about 15 percent of the volume of the column.

The chelating agent can be removed from the solution of apoenzyme if necessary by any suitable procedure. One such procedure for removing excess chelating agent involves passing the apoenzyme solution over a second gel column equilibrated with buffer.

The process of the present invention is applicable to metallo enzymes generally such as, for example, protease enzymes obtained by fermentation with Bacillus subtilis, Bacillus megaterium, Bacillus thermoproteolyticus, Bacillus cereus, Aspergillus oryzae, Streptomyces griseus, Strepto-myces naraensis and Bacillus subtilis species amylo-sacchariticus. Other metallo enzymes suitable for treatment in the present invention include bovine carboxypeptidase, aminopeptidase and alcohol dehydrogenase.

The invention will be understood more fully by reference to the following specific examples. It is understood that the examples are presented for the purpose of illustration only and are not intended as a limitation of the invention.

EXAMPLES

Example 1

This example illustrates the separation of zinc from neutral protease enzyme.

SEPHADEX G-25 (1X20 cm.) equilibrated with pH 7.2 Hepes buffer (0.01 M) containing 0.01 M calcium chloride and $2 \times 10^{-3}$M, 1,10-phenanthroline was packed into a filtration column. Neutral protease (25 mg.) obtained by fermentation of the organism Bacillus thermoproteolyticus and containing zinc as the activating metal was dissolved in pH 7.2 Hepes buffer (0.01 M) containing $2 \times 10^{-3}$M phenanthroline and 0.01 M calcium chloride. The resulting solution was introduced into the column and was allowed to percolate through the column. An enzyme solution from which an excess of 90% of the zinc had been removed was collected as a first fraction through the column. The zinc content of the thus recovered enzyme solution was determined by atomic absorption using a Beckman atomic absorption accessory (acetylene-air laminar flow burner) attached to a Beckman DU spectrophotometer and a 10-inch recorder.

In like manner, other metals such as copper, calcium, magnesium, manganese and cobalt are removed from metallo enzymes and other metallo enzymes such as alcohol dehydrogenase, aminopeptidase and carboxypeptidase are employed in the procedure.

Example 2

The procedure of Example 1 is carried out in all essential details with the exception that neutral protease obtained from Bacillus subtilis NRRL-B3411 was employed. No zinc was detected in the recovered enzyme solution.

Example 3

The procedure of Example 1 was repeated in all essential details with the exception that neutral protease obtained from Bacillus cereus was employed and neutral protease solution containing no detectable zinc was obtained.

Since many embodiments of this invention may be made and since many changes may be made in the embodiment described, the foregoing is to be interpreted as illustrative only and the invention is defined by the claims appended hereto.

We claim:

1. A process for removing metal from metal containing enzymes which comprises contacting a solution of metal containing enzyme and chelation agent for said metal with a hydrophilic, water-insoluble, cross-linked dextran polymer gel which gel retards the passage of metal complex of solution but does not retard the passage of the enzyme of solution and recovering from said gel a fraction containing enzyme substantially free of metal.

2. The process of claim 1 wherein the enzyme solution is recovered by washing the gel with an eluent.

3. The process of claim 2 wherein the eluent is a buffer.

4. The process of claim 1 wherein the solution is a buffer solution.

5. The process of claim 1 wherein the enzyme is neutral protease.

6. The process of claim 1 wherein the chelating agent is 1,10-phenanthroline.

7. The process of claim 1 wherein the polymer gel retards passage of solution material having a molecular weight less than 5,000.

8. The process of claim 1 wherein the polymer gel is contained in a column.

* * * * *

PO-1050
(5/69)

UNITED STATES PATENT OFFICE
CERTIFICATE OF CORRECTION

Patent No. 3,755,084            Dated August 28, 1973

Inventor(s) Joseph Feder and Linda R. Garrett

It is certified that error appears in the above-identified patent and that said Letters Patent are hereby corrected as shown below:

In the cover sheet heading [76], after "Inventors:" third line following "St. Louis, Mo. 63122" PLEASE INSERT --- assignors to Monsanto Company, St. Louis, Missouri ---.

Signed and sealed this 2nd day of April 1974.

(SEAL)
Attest:

EDWARD M. FLETCHER, JR.
Attesting Officer

C. MARSHALL DANN
Commissioner of Patents